Aug. 25, 1964  S. T. CARTER  3,145,825
SELECTIVE QUANTITY RATIO DIVIDER CONVEYOR
Filed Oct. 3, 1961  4 Sheets-Sheet 2

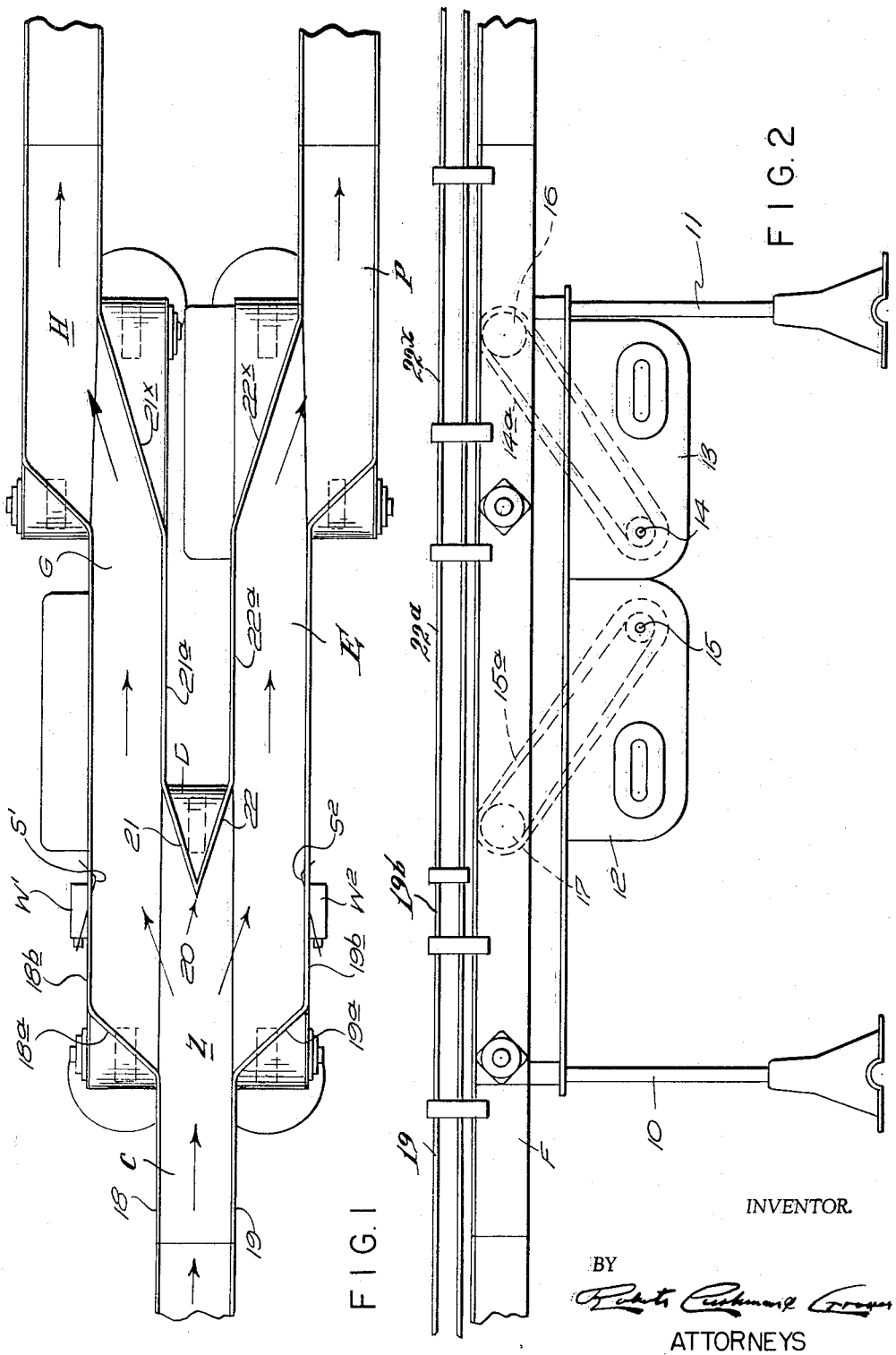

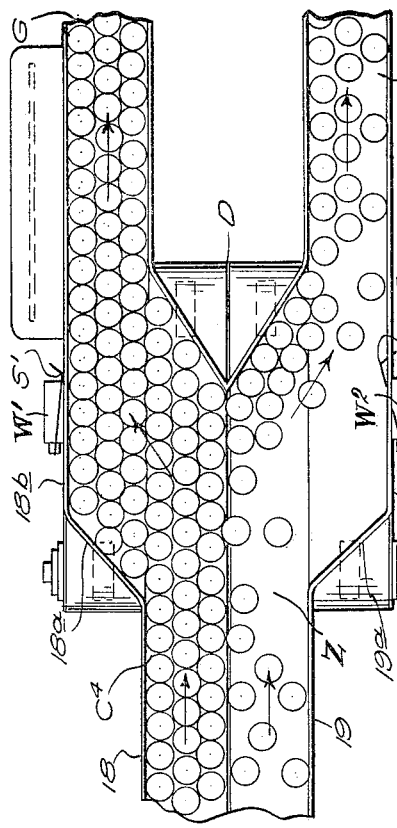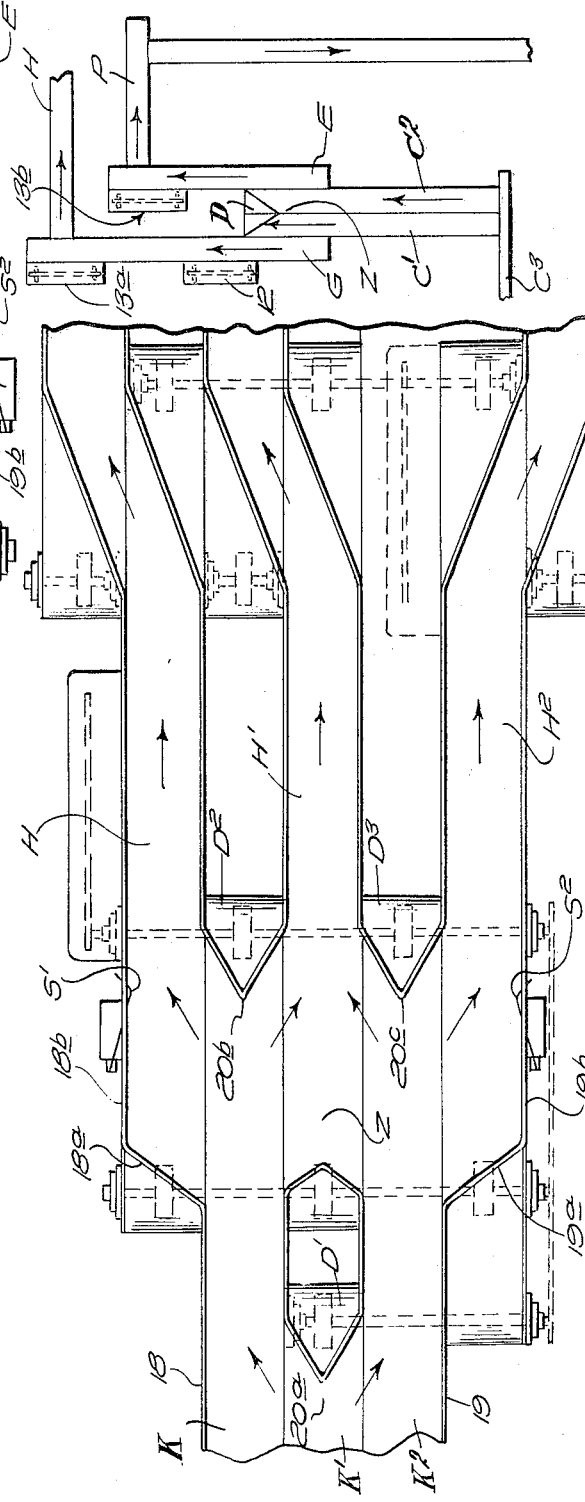

United States Patent Office 3,145,825
Patented Aug. 25, 1964

3,145,825
SELECTIVE QUANTITY RATIO DIVIDER
CONVEYOR
Sidney T. Carter, Shrewsbury, Mass., assignor to Geo. J. Meyer Manufacturing Co., Cudahy, Wis., a corporation of Wisconsin
Filed Oct. 3, 1961, Ser. No. 142,715
13 Claims. (Cl. 198—30)

This invention pertains to divider apparatus designed to receive articles, for example bottles or cans, from a source of supply and which, while advancing them uninterruptedly, divides them according to a predetermined ratio in delivering them to each, respectively, of a plurality of receivers, for instance conveyors, processing machines or other apparatus, and has for objects the provision of means of simple and inexpensive character for accomplishing the above results; which is capable of embodiment in apparatus of large capacity, but without requiring an undue amount of floor surface; and which is fully automatic in action although with provision for readily adjusting the ratio of division.

Other and further objects and advantages of the invention will be pointed out in the following more detailed description and by reference to the accompanying drawings wherein:

FIG. 1 is a diagrammatic plan view of a simple embodiment of the invention, wherein the articles to be divided are supplied by a single, constantly moving conveyor, and the articles are divided equally between two receivers, here shown as conveyors;

FIG. 2 is a diagrammatic side elevation of the apparatus of FIG. 1;

FIG. 5 is a fragmentary plan view illustrating the effect of delivering articles to one side, only, of the supply conveyor;

FIG. 6 is a fragmentary, diagrammatic plan view illustrating a modification wherein the articles are supplied by a triple conveyor and divided among three receiving conveyors;

FIG. 7 is a small scale floor plan showing a commercial installation embodying the principle of the apparatus of FIG. 1.

Figure 3:
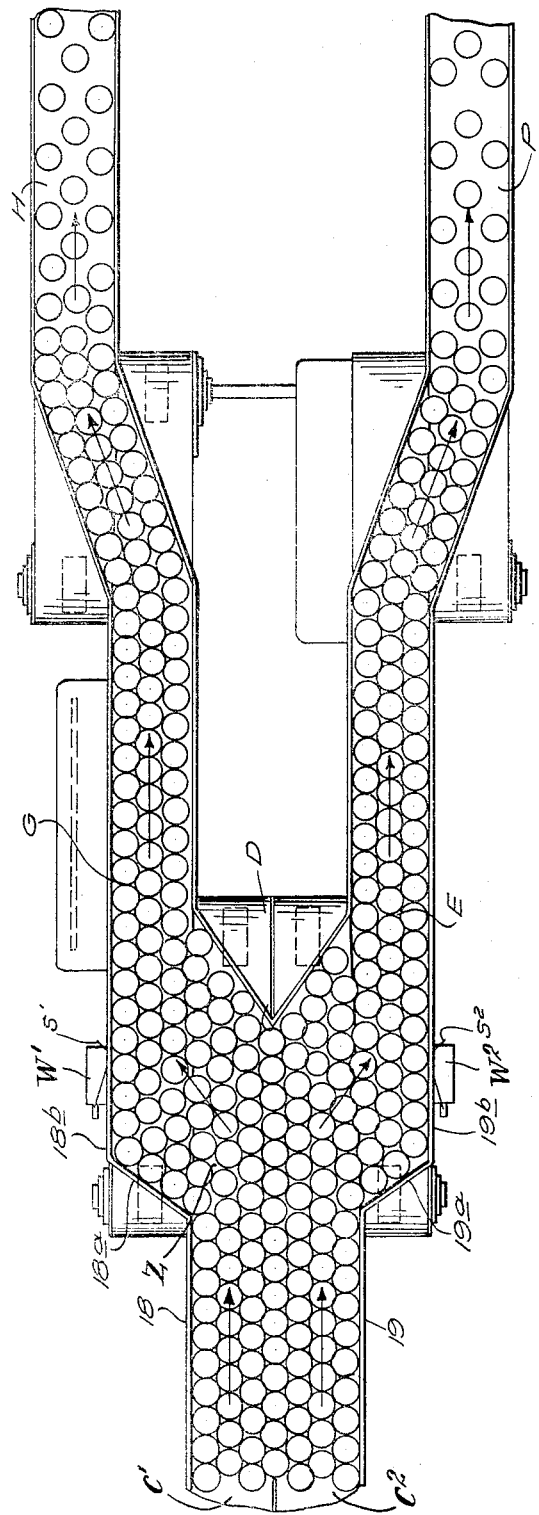
FIG. 3 is a fragmentary plan view showing apparatus like that of FIG. 1 when operating at full capacity.

Referring to the drawings and, in particular, to FIGS. 1 and 2, the character F indicates the frame of the divider apparatus, this frame being of any conventional or convenient construction and comprising supporting posts or legs 10 and 11. Suspended from this frame there are two motor housings 12 and 13, respectively, in each of which there is arranged an electrical motor 12a and 13a, respectively, diagrammatically indicated in FIG. 8. For simplicity in construction and accuracy of operation, the motor 13a within the housing 13 is a conventional two-speed motor, that is to say, a motor which will run at either of two definite predetermined speeds according to the setting of a circuit-controlling switch. For illustration, the motor shaft might turn at 1800 r.p.m. when the switch is adjusted for high speed, and at 900 r.p.m. when the switch is set for low speed. The motor 12a, supported by the housing 12 is a single-speed motor. The output shaft of the two-speed motor drive is indicated at 14 while the output shaft of the single speed motor drive is indicated at 15. Sprockets are fixed to each of these shafts which drive chains 14a and 15a, respectively, which pass around sprockets 16 and 17, respectively, fixed to horizontal shafts having bearings in the frame of the apparatus. Desirably, conventional speed-reducing means and a manually adjustable speed-varying mechanism (not here shown) are interposed between the output shafts 14 and 15 respectively, and the conveyors which they drive. The speed-varying mechanism may be designed, for example, to provide a speed range of from 1:1 to 3:1.

All of the conveyors herein disclosed may be of conventional type, that is to say, comprising an endless sprocket chain to whose individual links flat metal plates are attached which collectively provide an upper, horizontal article supporting run upon which articles, for example bottles or cans, may stand, with capability of sliding transversely of the conveyor when urged to do so as they are advanced by the conveyor. As shown in FIG. 2, a supply conveyor C brings the articles (for example bottles) into the field of action of the article-divider of the present invention.

The shaft to which the sprocket 16 is fixed carries sprocket wheels which engage the chains of two parallel dividing conveyors G and E (FIG. 1) so arranged that, at their receiving ends, their inner edges are substantially aligned with and closely adjacent to the outer edges, respectively, of the supply conveyor C. It will be understood that the article-supporting runs of conveyors C, G and E move in the same direction, that is, from left to right as viewed in FIG. 1. As shown, the terminal portion of conveyor C enters between the receiving end portions of conveyors G and E.

The conveyor C is provided with conventional parallel guard rails 18 and 19 at its opposite sides, respectively, these parallel guard rails merging with outwardly divergent rails 18a and 19a, respectively, which, in turn, merge with guard rails 18b and 19b, extending along the remote edges of the conveyors G and E. Although no adjusting means is here illustrated, it will be understood that the guard rails, as is customary in conveyor apparatus, would be adjustable toward and from each other to define article paths of different capacity.

A stationary article separator D, triangular in plan, as shown in FIG. 1, is arranged near the terminal end of the supply conveyor C with its apex 20 disposed in the vertical plane of the longitudinal center line of the conveyor C. This separator D has the outwardly divergent side walls 21 and 22 which merge, respectively, with the parallel guard rails 21a and 22a which extend along the proximate edges of the conveyors G and E, respectively, these rails 21a and 22a diverging outwardly at the terminal portions of the conveyors G and E to form article-deflectors 21x and 22x, respectively, by means of which articles, advancing along the conveyors G and E are diverted onto separate receivers, here shown as parallel conveyors H and P, respectively. While the receivers are here shown as conveyors, it is to be understood that articles delivered by the conveyors G and E may be disposed of in any desired way, for example, by allowing them to slide down suitably arranged chutes or directly into any suitable apparatus, for example a packing machine, a labeling machine, or the like. The space Z which is generally defined by the guide rails 18a, 19a, 18b, 19b, and the walls 21 and 22 of the separator D is hereinafter referred to as the "article-dividing area."

At points approximately opposite to the apex 20 of the separator D, the guard rails 18b and 19b are provided with apertures through which movable switch-actuating arms $S^1$ and $S^2$ respectively, normally project into said article dividing space so as to contact the paths defined by the conveyors G and E, respectively. These switch arms are so biased inwardly, for example by springs, as, when free to do so, they occupy the positions indicated in FIG. 1, but when they are moved outwardly by the pressure of articles filing the article-dividing space Z, these arms actuate switches $W^1$ and $W^2$, respectively. These switches are in series and are so connected into the circuit of the two-speed motor $13a$ that when the switches are thus actuated, this motor is speeded up from a normal low or preliminary speed to a high, or operating speed.

The motor within the housing 12 drives the supply conveyor C and is desirably adjusted to move the conveyor C to a linear speed which is approximately 15 to 20% faster than the "normal speed," that is to say, the operating speed at which the conveyor C could run, when filled solid with articles, without slippage of articles relatively to the conveyor.

In apparatus designed to divide the articles equally between the receivers H and P the conveyors G and E are always driven at equal speed and their guard rails are so spaced apart that each of the conveyors G and E is capable of receiving and moving the same number of articles. The normal or operating speed of the conveyors G and E is desirably 105% of the speed of the conveyor C, when the drive motor $13a$ for the conveyors G and E is running at "high speed" for example 1800 r.p.m., but in starting the apparatus and before the dividing conveyors G and E have been filled to capacity, these latter conveyors move at the lower of their two possible speeds, their drive motor $13a$ then running at "low speed," for example 900 r.p.m., so that they gradually fill up with articles when running at this preliminary speed. When, eventually, they are both filled to capacity, which under normal operating conditions takes but a very short time, the space Z will fill and articles in said space will press against the switch arms $S^1$ and $S^2$, forcing the latter outwardly. When both of these switch arms have been forced outwardly by the pressure of articles, the motor $13a$ which drives the dividing conveyors G and E automatically speeds up to its high or operating speed and because of their equal speed, these conveyors will remove an equal number or articles from space Z, so that the articles delivered by the conveyor C are now equally divided and delivered in equal numbers to conveyors H and P, and this condition continues so long as the articles are supplied to the full capacity of the apparatus.

If, on the other hand, and as will be pointed out more in detail hereinafter, one of the conveyors G, for example, were to have a linear velocity greater than that of the other conveyor E, then the conveyor G would take more articles from the dividing area, in a given unit of time, than the conveyor E, and the difference in the number of articles taken by the respective conveyors would be approximately in direct raito to the relative speeds of the conveyors.

Figure 8:
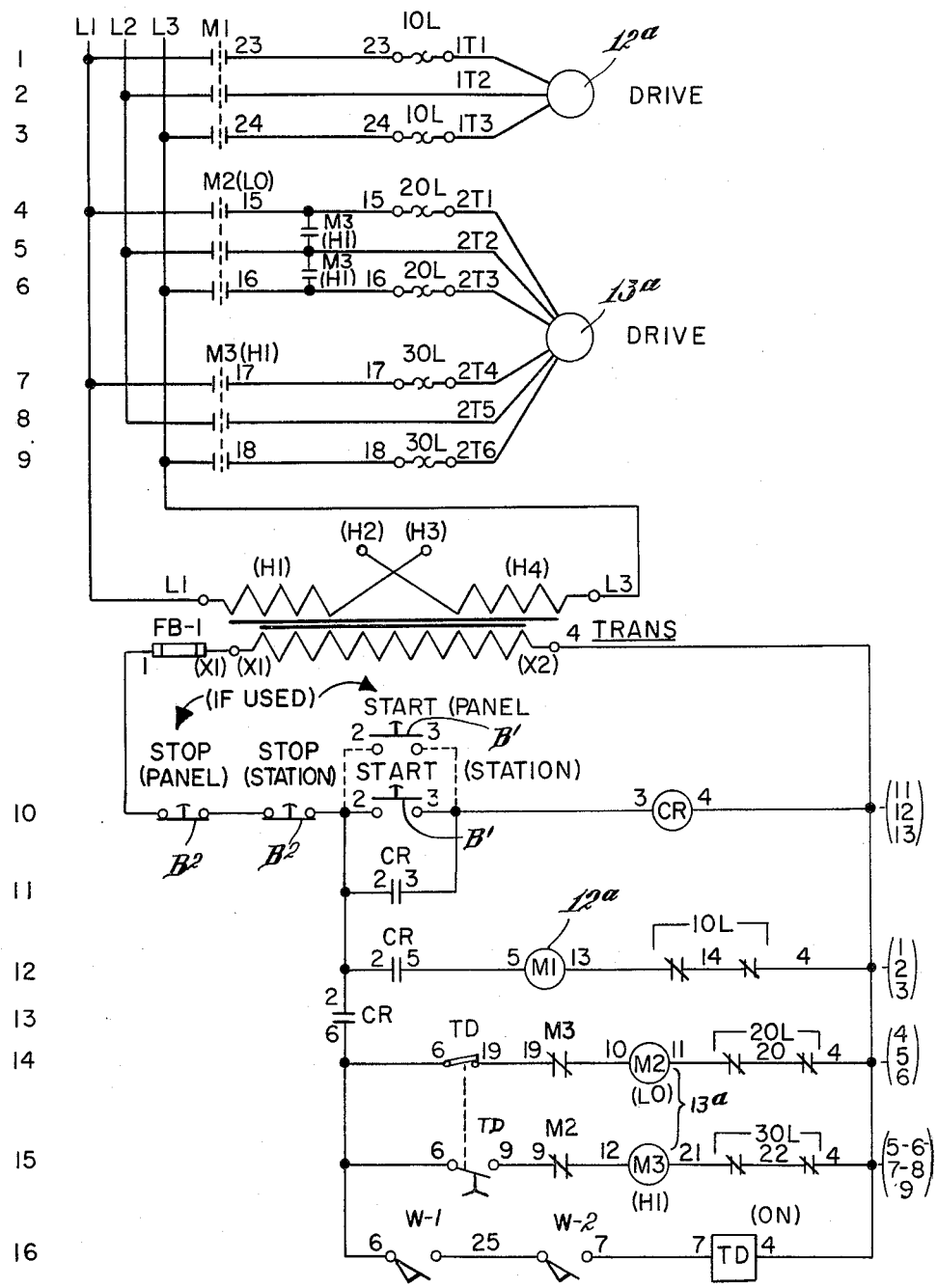
FIG. 8 is a wiring diagram showing a desirable motor-controlling circuit.

As shown in FIG. 8, the circuit for the motor which drives the conveyors G and E comprises, in addition to the switches $W^1$ and $W^2$, a time-delay device TD designed to provide a delay of from 5 to 10 seconds, after both switches have been closed, before the motor speed is changed. This is desired since were it not for such delay, a single can or bottle passing through space Z might, by chance, close the second switch after the first had previously been closed, and thus speed up the drive motor $13a$ (FIG. 8) for the conveyors G and E before both of the conveyors G and E were filled to capacity. With such a delay arrangement, the dividing space Z must be filled in order that both switches may be actuated to cause the motor speed to change from low to high. As diagrammatically shown, for example, in FIG. 8, the control circuit comprises a start button $B^1$ and a stop button $B^2$ at each of two stations, one of which, for example, may be at the machine control panel which may or may not be located near the machine itself, while the other buttons would be at a conveniently located emergency station in the close vicinity of the machine, thus permitting the machine operator to start or stop the machine without resorting to the main control panel. Referring to FIG. 8 the single-speed drive motor, which is located within the housing 12 (FIG. 1), is designated diagrammatically at $12a$ while the drive two-speed motor which is located within the housing 13 of FIG. 1 is diagrammatically designated by the character $13a$. The starter $M^1$ in the circuit diagram is that which controls the motor $12a$, while the starters $M^2$, an $M^3$, in the circuit diagram, are for controlling the low and high speed, respectively, of the motor $13a$.

Assuming that either of the two start buttons $B^1$ is depressed, the CR relay will be energized and will close its three normally open contacts. The closure of contacts 2, 3 will shunt out the start buttons $B^1$ so that relay CR will remain energized after the release of the start button. CR contacts 2, 5 will complete the circuit through the coil $M^1$ which, in turn, will close its three contacts $M^1$ ($L^1$, 23), ($L^2$, $1T^2$), ($L^3$, 24) and start the drive motor $12a$. Contact CR (2, 6) will complete the circuit through the coil $M^2$ which, in turn, will close its contacts $M^2$ ($L^1$, 15), ($L^2$, $2T^2$), ($L^2$, 16), and start the motor $13a$ at low speed. The starter coil $M^3$ will not be energized except under the following conditions. If switches $W^1$, $W^2$ are simultaneously closed they will complete the circuit through the time-delay TD which, after a predetermined time interval, for instance, from 5 to 10 seconds, will cause its contacts 6, 19 to open and contacts 6, 9 to close. This will break the circuit through the coil $M^2$ and complete the circuit through the coil $M^3$. The closure of the contacts of the starter coil $M^3$ will energize the high speed windings of the motor $13a$, so that this motor will go from low speed to high speed and remain at high speed so long as both switches $W^1$, $W^2$ are closed. If either or both of these switches be opened, thereby de-energizing time-delay TD, the contacts 6, 19 or the time delay will immediately close and the contacts 6, 9 will open which will result in causing the motor $13a$ to drop down at once from high speed to low speed. Thus by reason of the time delay TD, the apparatus may be expected to run for a substantial period before the motor drops back to low speed again. Of course, the more closely the high or operating speed of the motor is adjusted to the average rate of supply of articles to the apparatus, the fewer the number of speed changes.

If, as above suggested, the articles are delivered by the conveyors G and E to receiving conveyors H and P (the latter being driven from an independent source of power) these conveyors H and P should run faster than the conveyors G and E when the latter are moving at high or operating speed in order that articles may not back up from the conveyors H and P onto the conveyors G and E, and thus interfere with the proper operation of the divider.

Referring to FIG. 3, which is a fragmentary plan view showing the receiving end of a divider of the general type of that illustrated in FIGS. 1 and 2, the supply conveyor is shown as comprising two independent conveyors $C^1$ and $C^2$ which are parallel to each other and driven at the same linear velocity and whose adjacent edges are substantially in contact and which are arranged to deliver articles into the dividing space Z, into which projects the divider D with its apex 20 coinciding with the vertical plane defined by the adjacent edges of the conveyors $C^1$ and $C^2$. Guard rails 18, 19; $18a$, $19a$; and $18b$, $19b$, similar to those above described, are provided for restraining the articles as they are delivered by the conveyor $C^1$, $C^2$ to the dividing conveyors G and E which are driven by a two-speed motor $13a$ (FIG. 8), like the motor $13a$ above described which is within the housing 13 of FIG 1.

FIG. 3 shows the apparatus as filled to capacity with articles which are being delivered by the duplex conveyor $C^1$, $C^2$ (driven by a single-speed motor like the motor $12a$) into the dividing space Z where they are diverted by the separator D onto the parallel conveyors G and E, which eventually deliver them onto the conveyors H and P, respectively. As shown in this view, the dividing space Z is completely filled with articles and the switch arms $S^1$ and $S^2$ have been pushed outwardly from their normal positions so that, in this condition of the apparatus, the motor $13a$ which drives the conveyors G and E is running at high or operating speed. The operation of dividing the articles equally between the conveyors G and E is the same as described with reference to FIG. 1. As shown in this view, because of the higher speeds of the conveyors H and P, as compared with the speeds of the conveyors G and E, the articles on the conveyors H and P are spaced apart.

Figure 4:
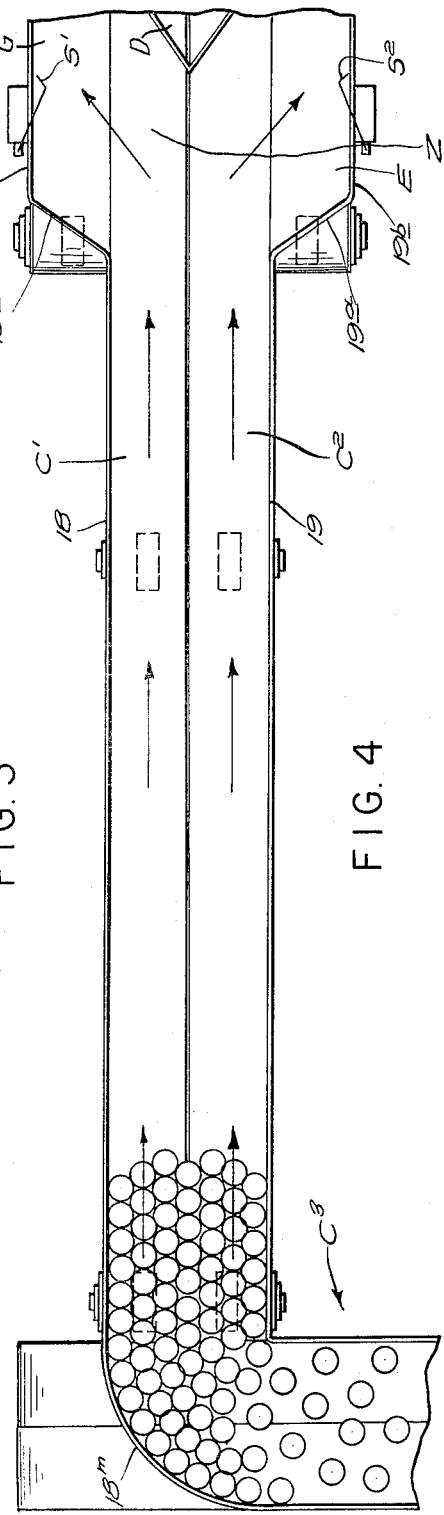
FIG. 4 is a fragmentary plan view of apparatus generally similar to that of FIG. 1, but showing the articles as supplied by a duplex conveyor to which they are delivered by conveyor means running at right angles to the duplex conveyor.

The arrangement of FIG. 4, is generally like that of FIG. 3, the articles being supplied to the duplex conveyor $C^1$, $C^2$ by conveyor means $C^3$ which advances the articles along a path, at right angles to the path defined by the guard rails 18 and 19, from which the articles are diverted onto the conveyor $C^1$, $C^2$ by the guard rail $18m$. Aside from the fact that the supply conveyor, in this instance, is duplex and that the articles are delivered to the supply conveyor by conveyor means moving at right angles to the supply conveyor, the apparatus is substantially like that of FIG. 1 and operates in dividing the articles equally between the conveyors G and E in the same way as the apparatus of FIG. 1.

Referring to FIG. 5 which is a fragmentary plan view showing apparatus generally similar to that of FIG. 3, the supply conveyor is shown as of duplex type, comprising the parallel, closely adjacent runs $C^4$ and $C^5$, and delivers articles into the dividing space Z where they are deflected by the separator D onto parallel, spaced dividing conveyors G and E. In this arrangement however, the articles are supplied to the duplex conveyor $C^4$, $C^5$ by a single conveyor $C^6$ so arranged that the articles are deposited on the conveyor $C^4$, only. The result of this is that the articles only gradually move over onto the conveyor $C^5$ and thus, when the operation first starts, a relatively small number of articles is available within the dividing space Z for diversion onto the conveyor E, although, as shown, the conveyor G is filled to capacity and the articles have backed into space Z until they have actuated the switch arm $S^1$. However, since the switches $W^1$ and $W^2$ are in series with the motor $13a$ (FIG. 8) for driving the conveyors G and E, both of these conveyors are still moving at low or preliminary speed so that eventually the dividing space Z will be completely filled with articles. Switch $W^2$ will then be closed, whereupon the drive motor for conveyors G and E will go up to high or operating speed and the normal functioning of the apparatus is thus initiated.

FIG. 6 is a fragmentary diagrammatic plan view illustrating an arrangement whereby articles are divided equally between three receivers illustrated as conveyors H, $H^1$ and $H^2$. In this apparatus the articles to be divided are advanced by a triple supply conveyor comprising the parallel runs K, $K^1$ and $K^2$ to which articles may be supplied from any desired source and in any appropriate manner. As shown, the outer conveyors K and $K^2$ have guide rails 18 and 19, respectively, at their outer edges which merge with outwardly divergent portions $18a$ and $19a$, respectively, which, in turn, merge with the rails $18b$ and $19b$, arranged at the outer edges of the parallel conveyors H, $H^1$ and $H^3$. These latter conveyors are driven by a two-speed electrical motor $13a$ (FIG. 8), like that above referred to, and are driven at low or preliminary speed until sufficient articles are being supplied to the dividing space Z to fill all three conveyors H, $H^1$ and $H^2$ to capacity.

Articles being advanced by the middle conveyor $K^1$ encounter the separator $D^1$ whose apex $20a$ is disposed in the vertical plane of the longitudinal center line of said conveyor $K^1$, so that the articles from conveyor $K^1$ are deflected onto the conveyors K and $K^2$. As the articles are advanced by the conveyors K and $K^2$ into the dividing space Z they encounter the two separators $D^2$ and $D^3$ whose apex edges $20b$ and $20c$ are disposed in the vertical planes, respectively, of the center lines of the conveyors K and $K^2$. These separators $D^2$ and $D^3$ deflect the articles so that they are distributed to the conveyors H, $H^1$ and $H^2$. Since all three of these conveyors are driven by the same motor at the same linear velocity, they remove equal numbers of articles, per unit of time, from space Z after the latter has been filled. When space Z is filled to capacity, the two switches $W^1$ and $W^2$ are actuated and the drive motor for the conveyors H, $H^1$ and $H^2$ goes up to high or operating speed.

In FIG. 7 is a small scale, diagrammatic plan view illustrating a commercial embodiment of the invention. The apparatus is shown as comprising a duplex supply conveyor $C^1$, $C^2$ like that of FIG. 4, arranged to receive articles from conveyor means $C^3$ arranged at right angles to the duplex conveyor and with a divider D arranged to divert articles from the dividing space Z onto the two parallel conveyors G and E. The duplex supply conveyor $C^1$, $C^2$ is driven by a single speed motor $12a$ (FIG. 8) in the same way as conveyor C in the arrangement of FIG. 1 above described. However, in the arrangement shown in FIG. 7, because of space limitations, it was necessary to make the conveyor G longer than the conveyor E and to arrange the receiving conveyors H and P at right angles to the conveyors G and E.

Because of the difference in length, it is convenient in this embodiment to drive conveyors G and E by independent motors arranged in the housings $13a$ and $13b$, respectively. Each of these motors is a two-speed motor and the speed, either low or high, of the two motors is normally the same.

Switches (not shown in FIG. 7) like the switches controlled by the fingers $S^1$ and $S^2$ of the preceding views, are arranged simultaneously to control the shift from low or preliminary to high or operating speed of both of the motors—the arrangement being such that until articles in sufficient quantity are being supplied to fill the conveyors G and E to capacity, these two conveyors run at the same low speed. However, when the dividing space Z is filled, both switches will be so actuated that the motors driving the conveyors G and E automatically and simultaneously step up to high or operating speed with the result that the conveyor G normally carries the same number of articles from the dividing area Z as does the conveyor E. This insures equal division of the articles between the conveyors G and E under most conditions. The fact that conveyor G is longer than conveyor E, has no effect on the ability of the apparatus to divide the articles equally. However, it has been found that if the conveyor E be less than approximately 24 inches in length, it sometimes happens, if the conveyors G and E are driven at the same identical speed, that the pressure of articles being advanced by conveyor $C^1$, $C^2$ may result in delivering articles onto the conveyor E so that they move along the latter at a speed faster than that of the conveyor itself. However, when, as in the arrangement disclosed in FIG. 7, the conveyors G and E are driven by independent motors, and assuming that each drive comprises a manually adjustable speed mechanism as above suggested, it is always possible to adjust the relative speeds of the conveyors G and E, even though the conveyor E be less than 24 inches in length, so as to insure the delivery of exactly the desired number of articles per minute to each of the receiving conveyors H and P.

The arrangement of FIG. 7 is thus illustrative of the fact that, by the apparatus herein disclosed, the articles may be divided according to a predetermined ratio, solely by control of the relative speeds of conveyors G and E. The arrangement of FIG. 7 also illustrates the adaptability of the invention to embodiment in apparatus designed for specific purposes and subject to space restrictions.

While certain desirable embodiments of the invention have herein been described and illustrated by way of ex-

I claim:

1. Article-dividing apparatus for dividing independent articles, advancing in disorderly array along a predetermined path, in accordance with a definite quantity ratio, said apparatus comprising conveyor means for uninterruptedly moving the articles along said path and into a dividing area, a plurality of dividing conveyors arranged to receive articles from said area, stationary separating means having article-contacting surfaces operative to deflect articles from the dividing area onto the several dividing conveyors, motor means operative to drive the dividing conveyors, said motor means being operative, at times, to drive each of the several dividing conveyors at a low or preliminary speed and, at times, to drive each of the several dividing conveyors, respectively, at operating speeds according to the quantity ratio in which articles are to be distributed among the several dividing conveyors, the operating speed of each respective dividing conveyor being different from its preliminary speed, and control means automatically operative to shift the speed of each dividing conveyor from the preliminary speed to operating speed.

2. Article-dividing apparatus according to claim 1, wherein the motor means is so designed as to drive all of the dividing conveyors at the same low linear speed until all of said conveyors are filled to capacity and then automatically to increase the speed of each of the dividing conveyors to the same high or operative speed.

3. Article-dividing apparatus according to claim 1, wherein a single two-speed motor drives all of the several dividing conveyors at the same operating speed whereby each conveyor removes the same number of articles, per unit of time, from the dividing area but only so long as the latter is full to capacity.

4. Apparatus according to claim 1, wherein the drive means for the several dividing conveyors is a single two-speed motor, characterized in having connections from said motor to the several dividing conveyors such that the operating speeds of all of the dividing conveyors is the same.

5. Article-dividing apparatus according to claim 1, wherein the control means comprises a plurality of movable detector elements so arranged as to be movable from a normal or inoperative position to an operative position by the pressure of articles accumulated within the dividing area, said detector elements being so related to the motor means as to cause a shift from preliminary to operative speed only after all of said detector elements have been displaced from normal position at the same time by the pressure of articles in the dividing area.

6. Article-dividing apparatus according to claim 1, having means for automatically delaying, for a predetermined interval of time, the shift from preliminary to operative speed after the control means initiate such change.

7. Article-dividing apparatus according to claim 1, and which is designed to divide the articles, among the several dividing conveyors, in accordance with a predetermined ratio other than one-to-one, and wherein the drive means comprises an independent two-speed motor for each of the several dividing conveyors, characterized in having motion-transmitting means interposed between each respective conveyor and its drive motor, said motion-transmitting means being so arranged that the operating speeds of the several conveyors are in accordance with said predetermined ratio.

8. Apparatus for delivering articles into each, respectively, of a plurality of paths according to a predetermined ratio and including means whereby articles, received from a supply, are advanced at a constant linear velocity in disorderly array into a dividing space and having conveyors, in number equal to the number of paths into which the articles are to be delivered, arranged to receive articles from the delivery space, and having stationary, rigid separator means operative to shunt articles from the dividing space onto the several conveyors respectively, in combination, a two-speed electric motor having high-speed coils and low-speed coils respectively, said motor being operative to drive the several conveyors each at either of two predetermined linear velocities, a supply circuit for the motor having therein a starting switch which, when closed, supplies current to the low-speed coils of the motor and thereby drives each of the several conveyors at a predetermined low speed until said dividing space is completely filled with articles, and means including a time-delay device operative, when the dividing space is completely filled with articles, to supply current to the high-speed coils of the motor thereby to drive each of the conveyors at high speed, thus insuring the filling to full capacity of each of the several paths with articles received from the dividing space.

9. The combination according to claim 8, wherein the means for shifting the motor from low to high speed comprises two switches in the motor circiut arranged, respectively, at opposite sides of the dividing space and which, when concomitantly closed by the pressure of articles within said space, completes the circuit through the high-speed coils of the motor.

10. The combination according to claim 8, further characterized in having manually-adjustable, speed-varying means whereby the velocities of the several conveyors may be relatively adjusted thereby, at will, to vary the number of articles delivered into the respective paths from the dividing space.

11. Article-dividing apparatus of the kind wherein articles are advanced at a constant linear velocity in disorderly array along a supply path into a dividing space and having conveyors, in number equal to the number of paths into which the articles are to be delivered, arranged to receive articles from the dividing space, and having stationary, rigid separators arranged to shunt articles from the dividing space onto the several conveyors respectively, in combination, motor means operative to drive each of the several conveyors at either of two definite predetermined velocities, manually-actuatable means for starting said motor means thereby to drive the several conveyors at low speed until the dividing space is completely filled with articles, and means automatically operative, when said dividing space is completely filled with articles, to cause the motor means to run at said higher speed.

12. Apparatus according to claim 11, further characterized in having time-delay means operative to delay the increase in speed of the motor means for a predetermined interval of time after the dividing space is completely filled.

13. Apparatus according to claim 11, further characterized in having independent motor means for each of the respective conveyors and having speed-adjusting means interposed between each of said motor means and its respective conveyor whereby the linear velocity of each respective conveyor, when running at high speed, may be adjusted manually relatively to the speed of the other conveyors.

References Cited in the file of this patent

UNITED STATES PATENTS

| | | |
|---|---|---|
| 1,990,549 | Kimball | Feb. 12, 1935 |
| 2,756,553 | Ferguson et al. | July 31, 1956 |
| 2,890,553 | Day et al. | June 16, 1959 |
| 2,920,738 | Carter | Jan. 12, 1960 |